United States Patent
Ash et al.

(10) Patent No.: US 12,451,624 B2
(45) Date of Patent: *Oct. 21, 2025

(54) ASSEMBLY FOR CLAMPING AND GROUNDING OBJECTS

(71) Applicant: IronRidge, Inc., Hayward, CA (US)

(72) Inventors: Jon Ash, Phoenix, AZ (US); Shawn J. Meine, Phoenix, AZ (US)

(73) Assignee: IronRidge, Inc., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,871

(22) Filed: Feb. 1, 2024

(65) Prior Publication Data
US 2024/0170865 A1    May 23, 2024

Related U.S. Application Data

(63) Continuation of application No. 17/586,307, filed on Jan. 27, 2022, now Pat. No. 11,929,583, which is a
(Continued)

(51) Int. Cl.
*F16B 7/18* (2006.01)
*F16B 2/12* (2006.01)
(Continued)

(52) U.S. Cl.
CPC .............. *H01R 9/18* (2013.01); *F16B 2/12* (2013.01); *F16B 7/187* (2013.01); *F24S 25/636* (2018.05); *H01R 13/648* (2013.01); *F16B 43/00* (2013.01)

(58) Field of Classification Search
CPC .. H01R 4/64; H01R 4/305; H01R 9/18; F16B 43/00; F16B 2/12; F16B 7/187;
(Continued)

(56) References Cited

U.S. PATENT DOCUMENTS

| 1,820,667 A | 8/1931 | Leyes |
| 2,116,776 A | 5/1938 | Bondeson |

(Continued)

FOREIGN PATENT DOCUMENTS

| AU | 2014100773 A4 | 8/2014 |
| DE | 102006025036 A1 | 11/2007 |

(Continued)

OTHER PUBLICATIONS

"Run on Sun Monthly Newsletter"; vol. 3, Issue 3; Mar. 2012; https://runonsun.solar/ newsletter/v2012/03-Newsletter.html.

*Primary Examiner* — Michael P Ferguson
(74) *Attorney, Agent, or Firm* — The Webb Law Firm (57) ABSTRACT

In various representative aspects, an apparatus for clamping and grounding solar panel frames to a mounting rail is disclosed herein. The apparatus includes a fastener with an enlarged end, and a shank, with the enlarged end having one or more sharp protrusions that resemble teeth, and a washer with one or more sharp protrusions, and an opening. When installed, the shank is inserted through the opening of the washer, the sharp protrusions of the enlarged end penetrate either the lower or upper surface of the mounting rail and the sharp protrusions of the washer penetrate the other surface of the solar panel frames while at the same time creating a grounding path through the apparatus.

7 Claims, 8 Drawing Sheets

Related U.S. Application Data continuation of application No. 16/227,145, filed on Dec. 20, 2018, now abandoned, which is a continuation of application No. 14/796,016, filed on Jul. 10, 2015, now Pat. No. 10,186,791, which is a continuation-in-part of application No. 13/542,570, filed on Jul. 5, 2012, now Pat. No. 9,689,411.

(51) Int. Cl.
  *F24S 25/636* (2018.01)
  *H01R 9/18* (2006.01)
  *H01R 13/648* (2006.01)
  *F16B 43/00* (2006.01)

(58) Field of Classification Search
  CPC ........ F24S 25/65; F24S 25/634; F24S 25/363; F24S 2025/6003; F24S 25/636; H02S 20/22; H02S 20/23; H02S 20/24
  See application file for complete search history.

(56) References Cited

U.S. PATENT DOCUMENTS

| | | | |
|---|---|---|---|
| 3,030,060 A | 4/1962 | Breuer |
| 3,486,158 A | 12/1969 | Soltysik et al. |
| 3,761,867 A | 9/1973 | Churla |
| 4,223,972 A | 9/1980 | Olsen |
| 4,780,086 A | 10/1988 | Jenner et al. |
| 4,806,108 A | 2/1989 | Meinhardt |
| 4,830,531 A | 5/1989 | Condit et al. |
| 5,006,074 A | 4/1991 | Franks, Jr. |
| 5,154,385 A | 10/1992 | Lindberg et al. |
| 5,207,588 A | 5/1993 | Ladouceur et al. |
| 5,209,619 A | 5/1993 | Rinderer |
| 5,271,586 A | 12/1993 | Schmidt |
| 5,928,006 A | 7/1999 | Franks, Jr. |
| 6,106,310 A | 8/2000 | Davis et al. |
| 6,186,799 B1 | 2/2001 | Mello |
| 6,343,904 B1 | 2/2002 | Wang |
| 6,588,711 B2 | 7/2003 | Onishi |
| 6,672,018 B2 | 1/2004 | Shingleton |
| 6,722,830 B2 | 4/2004 | Forster et al. |
| 7,073,995 B2 | 7/2006 | Herb |
| 7,435,134 B2 | 10/2008 | Lenox |
| 7,462,043 B2 | 12/2008 | Deisenhofer |
| 7,621,763 B2 | 11/2009 | Clark et al. |
| 7,820,667 B2 | 10/2010 | Ishihara et al. |
| 7,921,539 B2 | 4/2011 | Woodall et al. |
| 7,987,641 B2 | 8/2011 | Cinnamon |
| 8,025,508 B2 | 9/2011 | Parker et al. |
| 8,070,404 B1 | 12/2011 | Schluter |
| 8,092,129 B2 | 1/2012 | Wiley et al. |
| 8,152,575 B2 | 4/2012 | Boling et al. |
| 8,181,926 B2 | 5/2012 | Magno, Jr. et al. |
| 8,250,829 B2 | 8/2012 | McPheeters et al. |
| 8,317,526 B2 | 11/2012 | Gardner et al. |
| 8,360,811 B2 | 1/2013 | Aoki |
| 8,403,281 B2 | 3/2013 | Burtsher et al. |
| 8,464,478 B2 | 6/2013 | Tweedie |
| 8,505,864 B1 | 8/2013 | Taylor et al. |
| 8,640,401 B2 | 2/2014 | Hong et al. |
| 8,702,335 B2 | 4/2014 | Young |
| 8,740,163 B1 | 6/2014 | Taylor et al. |
| 8,801,349 B2 | 8/2014 | McPheeters |
| 8,858,142 B2 | 10/2014 | Suzuki et al. |
| 8,899,998 B2 | 12/2014 | Pyron |
| 9,038,329 B2 | 5/2015 | Pelman et al. |
| 9,074,616 B2 | 7/2015 | Wiley et al. |
| 9,080,792 B2 | 7/2015 | Patton et al. |
| 9,106,067 B1 | 8/2015 | Vernica |
| 9,147,986 B2 | 9/2015 | Redel |
| 9,160,273 B2 | 10/2015 | Schuit et al. |
| 9,175,715 B2 | 11/2015 | Babej |
| 9,196,978 B2 | 11/2015 | Magno |
| 9,638,223 B2 | 5/2017 | Redel |
| 9,671,136 B2 | 6/2017 | Ash et al. |
| 9,803,893 B2 | 10/2017 | Giraudo et al. |
| 9,819,302 B2 | 11/2017 | McPheeters et al. |
| 10,309,690 B2 | 6/2019 | West et al. |
| 10,451,314 B2 | 10/2019 | Markiewicz et al. |
| 10,644,643 B2 | 5/2020 | Stearns et al. |
| 11,121,484 B2 * | 9/2021 | Ash ............ H01R 13/648 |
| 11,189,941 B2 | 11/2021 | Ash et al. |
| 12,062,881 B2 * | 8/2024 | Ash ............ H01R 13/648 |
| 2006/0257229 A1 | 11/2006 | Bucciferro et al. |
| 2007/0212935 A1 | 9/2007 | Lenox |
| 2008/0053517 A1 | 3/2008 | Plaisted et al. |
| 2008/0146074 A1 | 6/2008 | Deisenhofer |
| 2009/0000220 A1 | 1/2009 | Lenox |
| 2009/0064626 A1 | 3/2009 | Sen |
| 2009/0068873 A1 | 3/2009 | Kulig |
| 2009/0232616 A1 | 9/2009 | Sekreta |
| 2010/0180933 A1 | 7/2010 | Aftanas et al. |
| 2010/0276558 A1 | 11/2010 | Faust et al. |
| 2011/0000519 A1 | 1/2011 | West |
| 2011/0039430 A1 | 2/2011 | Aftanas |
| 2011/0100433 A1 | 5/2011 | Jonczyk |
| 2011/0121153 A1 | 5/2011 | Magno, Jr. et al. |
| 2011/0138585 A1 | 6/2011 | Kmita et al. |
| 2011/0179606 A1 | 7/2011 | Magno, Jr. et al. |
| 2011/0214365 A1 | 9/2011 | Aftanas |
| 2012/0076614 A1 | 3/2012 | Baghdasarian |
| 2012/0117895 A1 | 5/2012 | Li |
| 2012/0234378 A1 | 9/2012 | West et al. |
| 2013/0200245 A1 | 8/2013 | Markiewicz et al. |
| 2015/0052712 A1 | 2/2015 | Markiewicz et al. |
| 2015/0249423 A1 | 9/2015 | Braunstein et al. |
| 2015/0311606 A1 | 10/2015 | Meine et al. |
| 2017/0063300 A1 | 3/2017 | Ash |
| 2017/0085219 A1 | 3/2017 | Ash et al. |

FOREIGN PATENT DOCUMENTS

| | | |
|---|---|---|
| DE | 202012003649 U1 | 4/2012 |
| FR | 2959744 A1 | 11/2011 |
| GB | 983878 A | 2/1965 |
| GB | 1064674 A | 4/1967 |
| JP | 3810958 B2 | 8/2006 |
| JP | 5593649 B2 | 9/2014 |
| KR | 101189607 B1 | 10/2012 |
| WO | 2012143811 A2 | 10/2012 |

* cited by examiner

ASSEMBLY FOR CLAMPING AND GROUNDING OBJECTS

CROSS-REFERENCE TO RELATED APPLICATIONS

This application is a continuation of U.S. patent application Ser. No. 17/586,307 filed Jan. 27, 2022, which is a continuation of U.S. patent application Ser. No. 16/227,145 filed Dec. 20, 2018, now U.S. Pat. No. 11,239,577, which is a continuation of U.S. patent application Ser. No. 14/796,016 filed Jul. 10, 2015, now U.S. Pat. No. 10,186,791, which is a continuation-in-part of U.S. application Ser. No. 13/542,570 filed Jul. 5, 2012, now U.S. Pat. No. 9,689,411, the disclosures of which are hereby incorporated by reference in their entirety.

BACKGROUND OF THE INVENTION

The present invention relates generally to providing an apparatus for clamping multiple objects together and providing a grounding path between the objects. More specifically, the invention relates to providing a way for the assembly to penetrate metallic objects to better secure the assembly when clamping the objects together while at the same time providing a grounding path between them. One exemplary application of the assembly is to affix a solar panel frame to a mounting rail.

Existing solutions are either unsatisfying in providing sufficient electrical grounding capacity or too complicated to manufacture or install. For example, U.S. Pat. No. 5,006,074 (Franks) teaches an adjustable clamping device using a threaded bolt with an abrading surface to penetrate an outer surface to ground a conductor. The device is not designed to affix two or more objects. U.S. Patent Application Publication No. 2011/0039430 (Aftanas) discloses a fastening assembly with a metallic bolt and a metallic leaf spring. The metallic leaf spring has at least one tooth projecting from one of the opposing ends. The tooth may penetrate the solar panel frame or the support frame member and ground the solar panel frame. Because the leaf spring is non-structural, it only has the capacity to clamp objects together while at the same time providing a grounding path between them.

Another example is U.S. Patent Application Publication No. 2011/0179606 (Magno et al.), which discloses an assembly for clamping two objects with a single hand and for grounding the objects. Because the assembly has many unnecessary parts (such as a channel member and a clamp with a three-prong first member, a washer, a nut, a threaded bolt, a spring, and a torsion spring) the design is unnecessarily complex. Thus, a less complex assembly that provides grounding and is both easy to use and manufacture is desired.

SUMMARY OF THE INVENTION

The disclosure herein is summarized below only for purposes of introducing embodiments of the invention. The ultimate scope of the disclosure herein is to be limited only to the claims that follow the specification.

The disclosure herein provides a mechanism for fastening two or more objects together and providing a grounding path between the objects that is both easy to manufacture and install.

An exemplary embodiment of the disclosure herein includes a fastener and a washer for clamping at least two objects. The fastener includes, in an exemplary embodiment of the disclosure herein, a shank and an enlarged end with one or more raised portions for penetrating a first object. The washer has an opening and one or more raised portions for penetrating at least one other object. The raised portion, in an exemplary embodiment of the disclosure herein, defines a tooth or other similar structure as long as it has a sharp ridge, or any kind of configuration that is suitable for penetrating metallic surfaces. When installed, the shank is disposed through the opening of the washer.

An example of the fastener is at-bolt comprising a head (an enlarged portion) and a shank, with teeth protruding from the head. In an exemplary embodiment of the disclosure herein, the fastener is used to clamp a solar panel frame to a mounting rail by enabling the teeth of the t-bolt to penetrate into the mounting rail and the teeth of the washer penetrating into the solar panel frame, so that the embodiment provides a secure grip. When a proper force is applied during assembly, the teeth of the t-bolt penetrate through the coated surface to make electrical contact with the metallic rail while the teeth of the washer penetrate through the coated surface to make electrical contact with the metallic solar panel frame. A grounding path is then formed from the solar panel frame to the mounting rail via the washer and the t-bolt.

In another exemplary embodiment, the t-bolt and the washer are coupled by the external thread of the t-bolt and internal thread of the washer's opening. Alternatively, a threaded nut is used to fasten the washer to the t-bolt. In an exemplary embodiment of the disclosure herein, the washer is flat and includes one or more flanges. The teeth are located on the flange, the flat portion, or both. The washer has one or more elongated side portions which extend downward (toward the enlarged end of the fastener when assembled). In an exemplary embodiment of the disclosure herein, the side portion(s) are located on the same side of the flange(s).

In an exemplary embodiment of the disclosure herein, an assembly that includes a fastener and a washer used to clamp at least three metallic objects. The fastener comprises an enlarged end with at least one raised portion and a shank. The washer includes multiple raised portions and an opening. When installed, the raised portions of the fastener penetrate the first object, at least one raised portion of the washer penetrates the second object, and at least one raised portion of the washer penetrates the third object. The assembly provides one or more grounding paths from one object to another.

Additionally, the washer in this embodiment has at least one elongated side portion that extends downward (toward the enlarged end of the fastener when assembled). The side portion is located on the same side of a flange if the washer also has one or more flanges. The side portion is used to separate objects that are contacted by the washer.

In an exemplary embodiment of the disclosure herein, the assembly with a metallic t-bolt with a shank and a head that has teeth and a metallic washer with an opening and teeth may be used to couple two metallic solar panel frames and a metallic mounting rail. An electrical grounding path from the mounting rail to a solar panel frame is formed when the teeth of the t-bolt penetrate into the surfaces of the mounting rail and the teeth of the washer penetrate one of the solar panel frames so that the teeth make electrical contact with the mounting rail and the frames. Similarly, the assembly creates a grounding path between the panel frames when the teeth of the washer penetrate surface of both the solar panel frames and make electrical contact with them.

Similarly, in an exemplary embodiment of the disclosure herein, the assembly is used to clamp two or more objects with the raised portions of the fastener and the raised portion of the washer contact the same objects. Therefore, there are at least two grounding path between two affixed objects-one from the first object through the washer alone to the second object, and the other from the first object through the washer and the fastener and finally to the second object. An example is when the assembly is used to clamp two metallic solar panel frames and provide grounding path between them, without the metallic mounting rail at the bottom.

In an exemplary embodiment of the disclosure herein, a method for affixing a metallic object to another metallic object is disclosed. An exemplary method includes the steps of using one of the aforementioned assemblies to clamp two or more objects and thus creating at least an electrical grounding path between the objects.

A person with ordinary skill in the relevant art would know that any shape or size of the fastener or the washer may be adopted as long as the assembly can be used to clamp two or more objects and provide a grounding path. Any combinations of suitable number, shape, and size of raised portions of the fastener and the washer may be used. Also, any materials suitable to achieve the object of the current invention may be chosen, such as stainless steel or metallic materials.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

DETAILED DESCRIPTION OF THE EXEMPLARY EMBODIMENTS

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the inventions is not limited to the examples that are described below.

Figure 1:
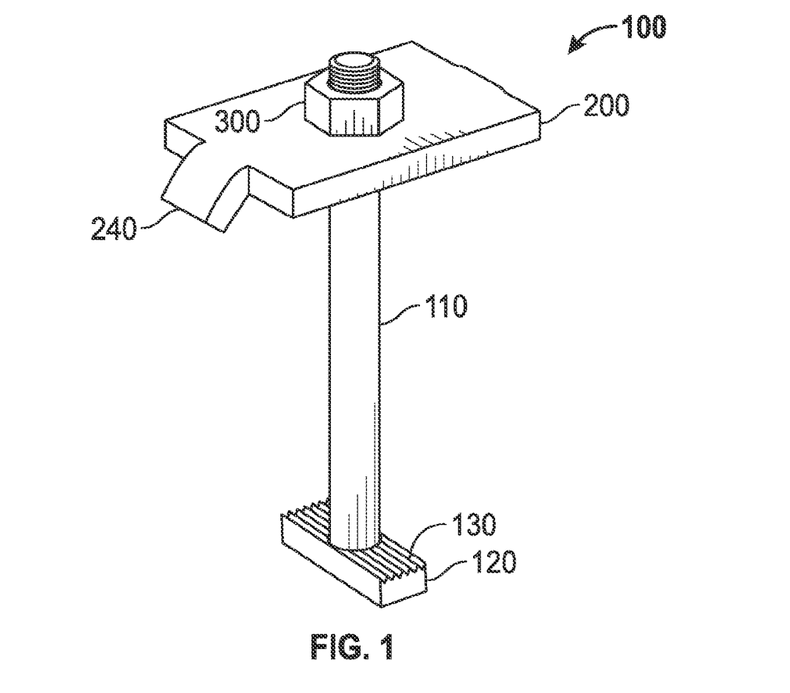
FIG. 1 shows the profile view of an embodiment of the apparatus.
Figure 2:
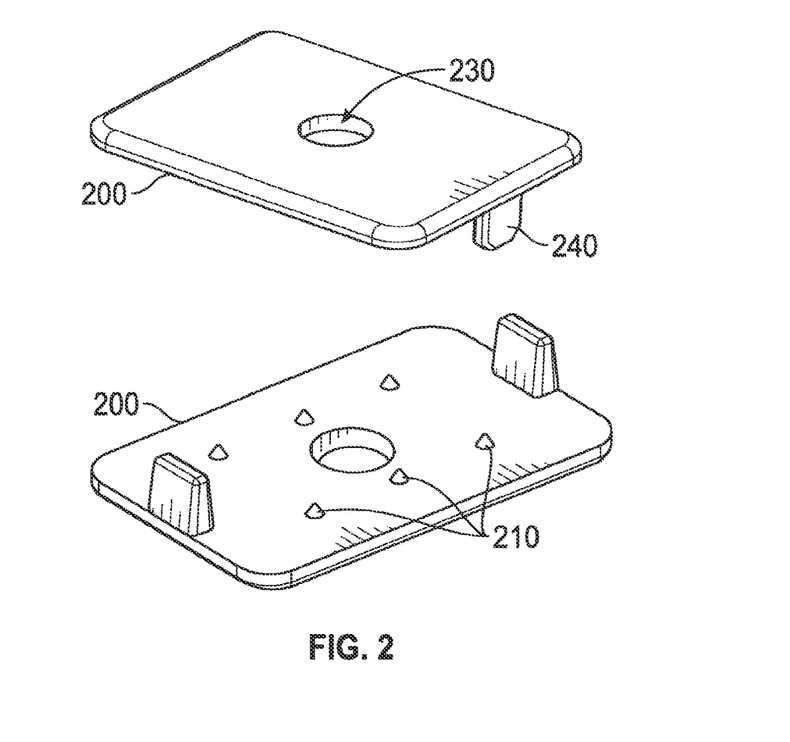
FIG. 2 illustrates the upper and lower sides of the washer in FIG. 1.

FIG. 1 illustrates an embodiment of the assembly for securing solar panel mounting frames a fastener 100, which comprises a shank 110 and an enlarged end 120 (also referred to as a "head"), on which there are multiple raised portions 130, which are typically sharp ridges. The embodiment includes a washer 200 and a nut 300. The washer 200 has two elongated side portions 240, which are bent downward. The washer 200 has an opening 230 (as shown in FIG. 2), through which the shank 110 is inserted. The upper side and lower side of the washer 200 are shown in FIG. 2. The lower side of washer 200 also includes multiple raised portions 210, which resemble sharp teeth-like structures capable of penetrating metallic structures such as the solar panel mounting frames.

Figure 3:
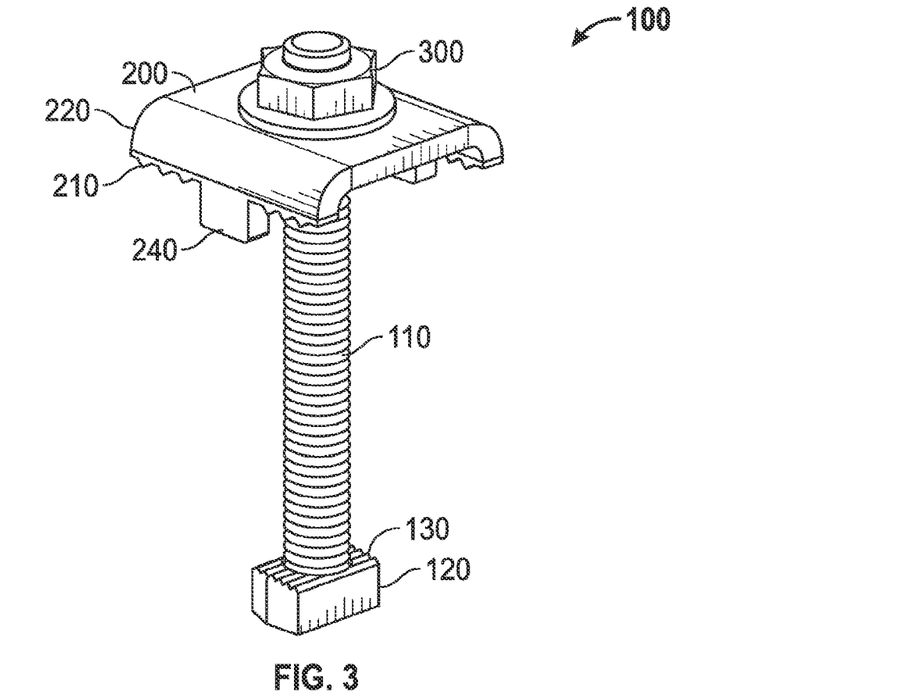
FIG. 3 illustrates an alternate embodiment of the assembly.

FIG. 3 illustrates another embodiment of this invention. In this embodiment, the shank 110 is externally threaded, the washer 200 further comprises two flanges 220 that are bent downward, and the raised portions 210 are located on the edges of flanges 220. This embodiment also has elongated side portions 240 on the flanges 220.

Figure 4:
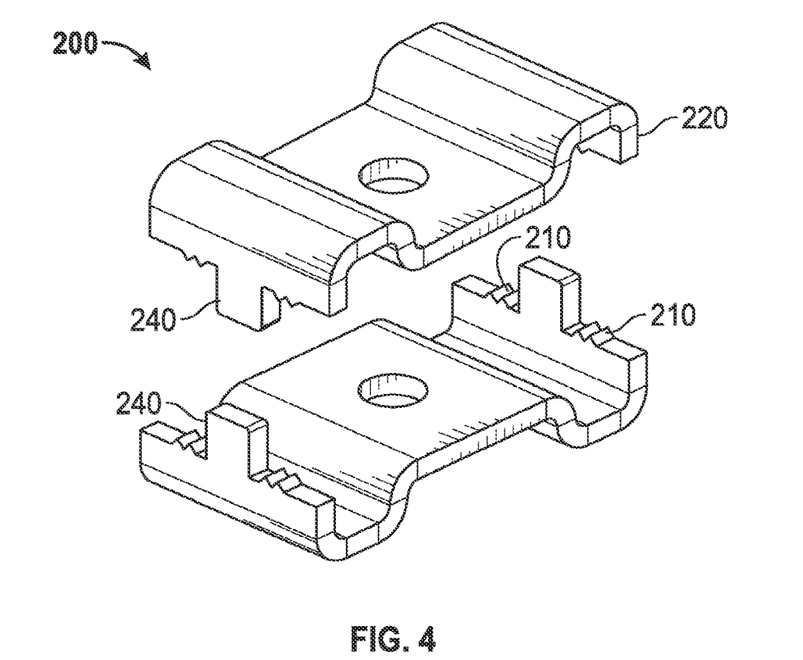
FIG. 4 illustrates an alternate embodiment of the washer.

An alternate embodiment of a washer with flanges is illustrated in FIG. 4. In this embodiment, the washer 200 has arch-shaped flanges 220. The raised portions 210 and the elongated side portions 240 are also located on the edges of the flanges 220.

Figure 5:
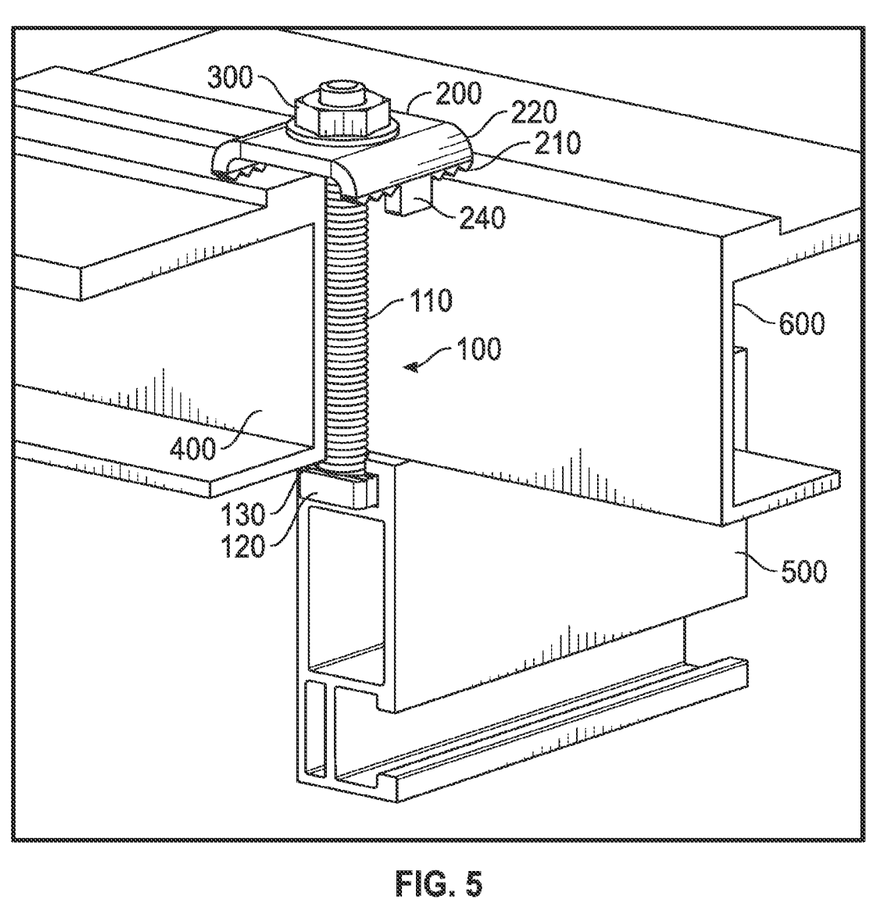
FIG. 5 shows a cross-section view when the embodiment in FIG. 3 is utilized for its intended purpose.

FIG. 5 shows a cross section when the exemplary assembly in FIG. 3 is used to clamp two parallel solar panel mounting frames 400 and 600, and a mounting rail 500 that runs under and perpendicular to the frames 400 and 600. Presumably, the frames 400 and 500, and the rail 600 have a surface treatment layer on the outer portion such as an anodization layer or other similar layer that covers an electrically conducting portion of these frames and rail. The threaded shank 110 is disposed through the openings of the washer 200 and the nut 300. The enlarged end 120 of the fastener 100 is in contact with the rail 500, with the sharp ridges 130 penetrating into the surface treatment layer of the rail 500. The washer 200 contacts the frames 400 & 600 at the flanges 220, so that the raised portions 210 can penetrate into the two frames 400 and 600 below their surface treatment layers. An elongated side portion 240 of the washer 200 is located on the flange 220 and is placed between frames 400 and 600 to separate them. If the frames 400 and 600, the fastener 100, and the washer 200 are of suitable materials, the assembly forms an electrical grounding path between the frames 400 and 600 through the washer 200, between the frame 400 and rail 500 through the washer 200 and the fastener 100, and between the frame 600 and rail 500 through the washer 200 and the fastener 100.

Figure 6:
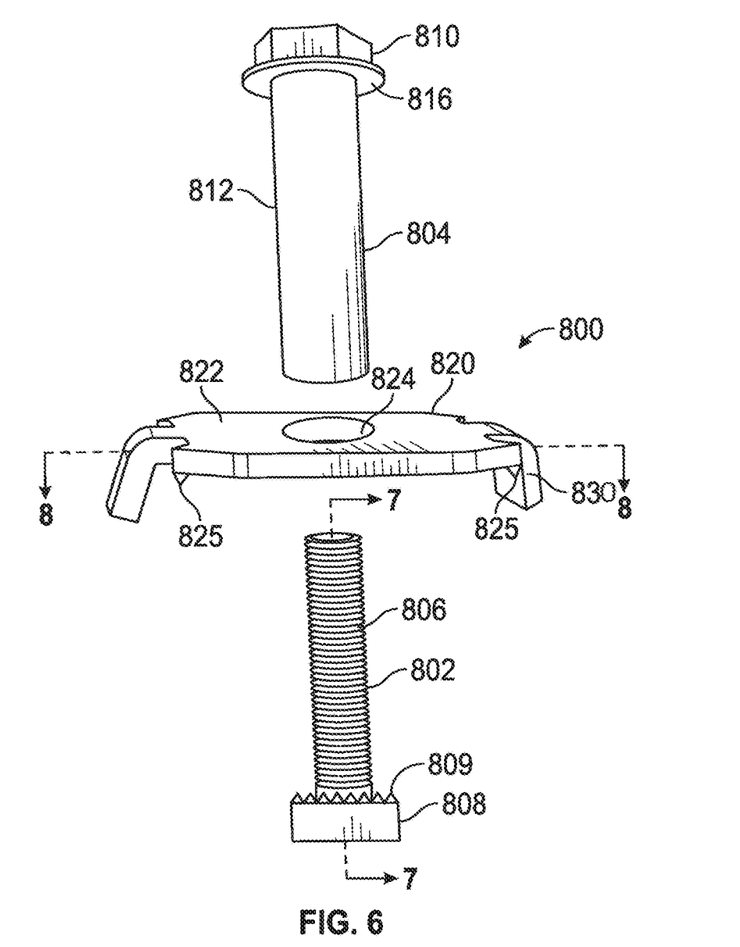
FIG. 6 illustrates an exploded view of another exemplary embodiment of the clamping assembly in accordance with this disclosure.
Figure 7:
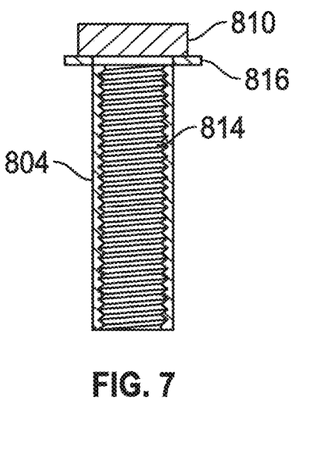
FIG. 7 illustrates a cross sectional view of the male member of the exemplary embodiment of the clamping assembly along line 7-7.
Figure 8:
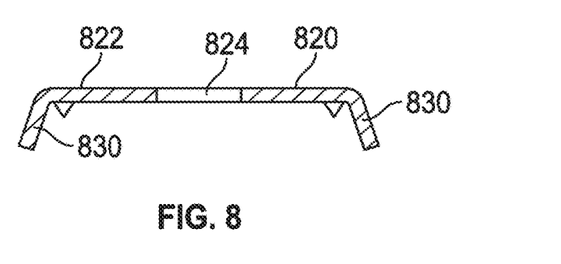
FIG. 8 illustrates a cross sectional view of the piercing member of the exemplary embodiment of the clamping assembly along line 8-8.

With particular reference to FIGS. 6-8, there shown another exemplary embodiment of the clamping assembly, generally indicated by the numeral 800. The clamping assembly 800 includes a male member 802 and a female member 804. Together the members 802 and 804 define a fastener.

The male and female members are interlocking. The male member has an elongated male element defining a threaded shank 806 and an enlarged end defining a T-bolt end 808. The T-bolt end 808 includes at least one raised portion 809 that is capable of penetrating the surface treatment layer of the mounting rails. In the embodiment shown, there are a plurality of raised portions 809 defining teeth, which create a pre-determined pattern. The pattern facilitates the penetration of the mounting rails by the male member 802. Additionally, in the embodiment shown, the entire male member 802 is electrically conductive and made from electrically conductive material.

Likewise, the female member 804 is also electrically conductive. The female member 804 includes a nut end 810 and an elongated female element 812 extending from it. The nut end 810 is not limited to a conventional hexagonal nut and can comprise any drive type capable of advancing the female member 804 by hand or with a tool such as a torx or alien drive.

The elongated male element 806 has external threads 802 and defines a screw. The elongated female element 812 defines a sheath and has internal threads 814 as shown clearly in FIG. 7, a cross sectional view of the female member 804 of FIG. 6.

The external threads 807 of elongated male element 806 compatibly engage the internal threads 814 of the female member 804. The external threads engaged in such a manner are within the sheath and are therefore covered and protected from weathering. Thus, this structure provides an adjustable interlocking fastener assembly for among other things mounting solar panel frames on rails as discussed above and which, will be more appreciated through the discussion below.

In the embodiment shown in FIGS. 6-8, the clamping assembly 800 includes a washer 816 adjacent the nut end 810. In the embodiment shown, the washer 816 is integrated with the nut end 810. Thus, the washer 816 and female member 804 define a single structure in this embodiment. In other exemplary embodiments, the washer 816 is a separate element from the female member 804 and rotates freely and moves freely longitudinally with respect to the elongated female element 812, and the sheath, in particular.

In the embodiment shown in FIGS. 6-8, the clamping assembly 800 includes a piercing member 820. In one exemplary embodiment, when assembled the piercing member 820 is adjacent the nut end 810. The piercing member 820 has a base 822 with a center opening 824. The center opening 824 is sized and shaped to allow the elongated female member 812 passage through the center opening 824.

In the embodiment illustrated in FIGS. 6-8, the base 822 has at least one raised portion for penetrating a metal frame as described above. The raised portion defines a penetrating member 825. In the embodiment shown, there is a plurality of raised portions defining penetrating members 825. The penetrating members 825 have edges that are sharp and designed for piercing a surface treatment layer with only hand pressure, in accordance with the above teaching with respect to FIGS. 1-5. Additionally, and in accordance with the teaching with respect to FIGS. 1-5, the piercing member 820 acts as a washer.

In the embodiment illustrated in FIGS. 6-8, the base 822 has downturned side members defining ears 830. The ears 830 function as spacers to separate adjacent solar panels upon assembly onto the frames and rails. The ears 830 are diametrically opposite one another as illustrated, but of course, other exemplary embodiments are within the spirit and scope of the disclosure herein.

In the embodiment shown in FIGS. 6-8, the base 822 is adjacent the nut end 810 upon assembly. In the embodiment shown, the base 822 is independent of the shank and the nut end 810. Thus, the piercing member 820 moves freely with respect to the clamping assembly 800. In other words, the piercing member 820 rotates freely through the center opening 824 and slides freely along the longitudinal axis of the elongated female member 812.

In other exemplary embodiments, the base 822 defines an integrated structure with the female member 804. In this exemplary embodiment, the piercing member 820 and the female member 804 define a single integrated structure. The piercing member 820, in this embodiment, does not rotate or move freely with respect to the elongated female element 812, and in particular, the sheath.

In the embodiment shown in FIGS. 6-8, the sheath has an outer surface that is smooth. This, of course, facilitates the free movement of the washer 816 and piercing member 820 where appropriate in the particular exemplary embodiments discussed above.

Figure 9:
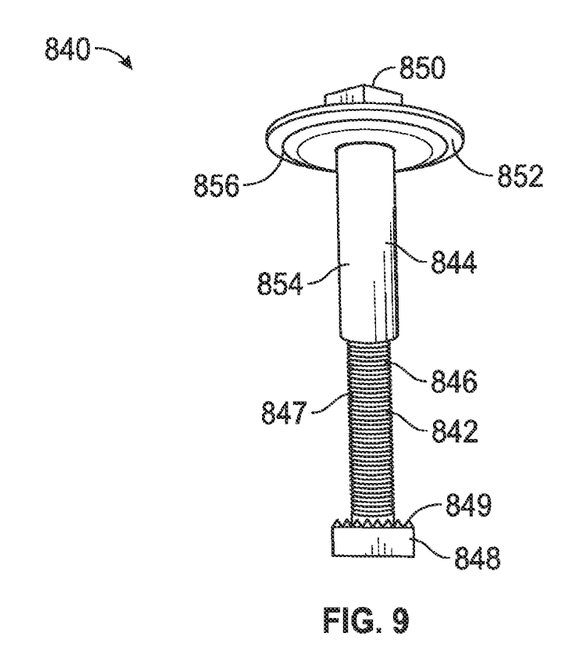
FIG. 9 illustrates a perspective view of an exemplary embodiment of a rounded head mid-clamp in accordance with the disclosure.
Figure 10A:
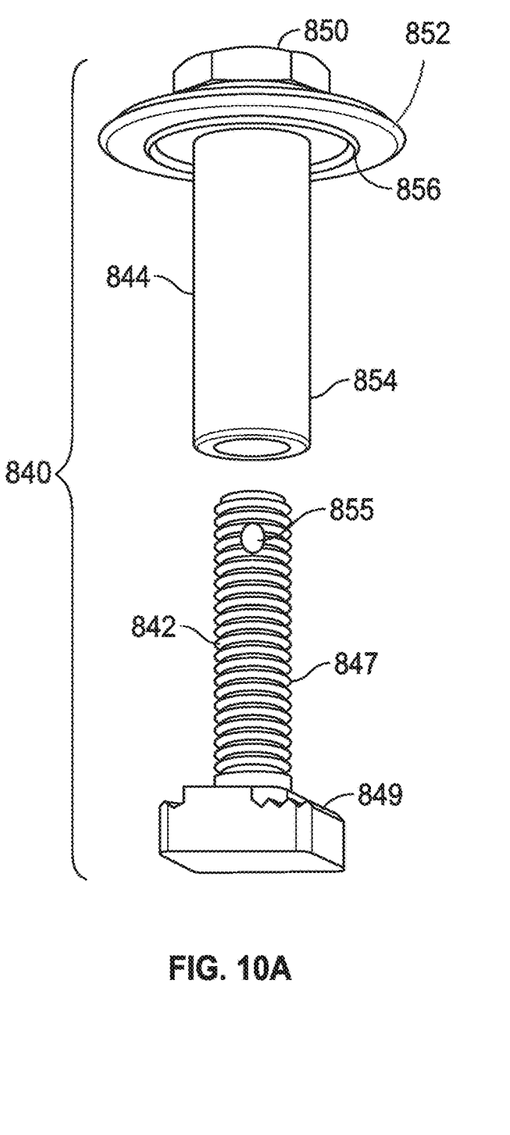
FIG. 10A illustrates in perspective view, an exemplary embodiment of a rounded head integrated mid clamp fastener.
Figure 10B:
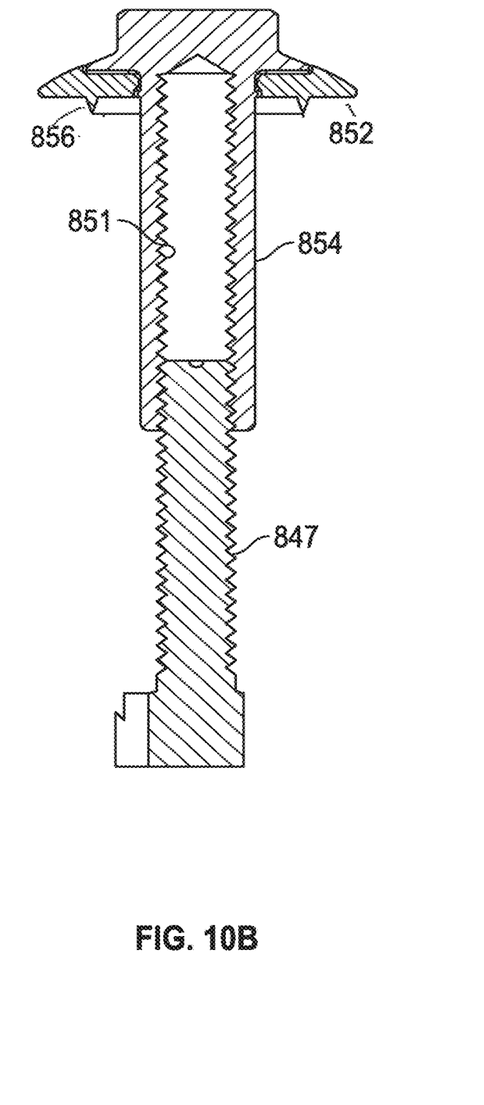
FIG. 10B illustrates, in cross sectional view, the exemplary embodiment of the rounded head integrated mid clamp fastener of FIG. 10A.
Figure 11:
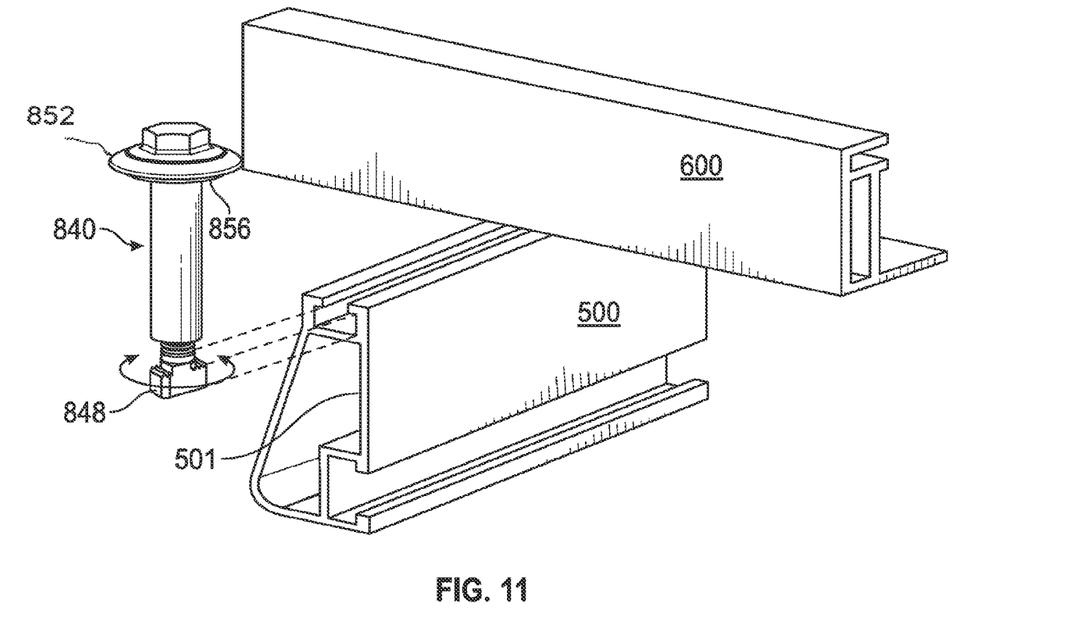
FIG. 11 illustrates a perspective view during assembly of the exemplary embodiment of the rounded head mid-clamp of FIG. 9.

With respect to FIGS. 9-11, there is shown another exemplary embodiment of a rounded head mid-clamp clamping assembly, indicated generally by the numeral 840. The rounded head mid-clamp clamping assembly 840 defines an integrated structure, such all of the elements of the female member are one piece. As described above, with respect to FIGS. 6-8, the clamping assembly 840 includes a male member 842 and an integrated female member 844. Together the members 842 and 844 define a fastener of the kind described with respect to FIGS. 6-8 and FIGS. 1-5.

The male and female members, 842 and 844 are interlocking. The male member has an elongated male element defining a threaded shank 846 and an enlarged end defining a T-bolt end 848. The T-bolt end 848 includes at least one raised portion 849 that is designed for penetrating the surface treatment layer of the solar panel mounting rails. In the embodiment shown, there are a plurality of raised portions 849 defining teeth, which create a pre-determined pattern. The pattern facilitates the penetration of the surface treatment layer of the rails by the male member 842 with only a pressure fit. Additionally, in the embodiment shown, the male member 842 is electrically conductive and made from electrically conductive material.

Likewise, the entire female member 844 is also electrically conductive. The female member 844 defines an integrated member that includes a nut end 850, an annular ring 852 defining a piercing member 856, best seen in FIGS. 10A and 10B. The nut end 850 is not limited to a conventional hexagonal nut and can comprise any drive type capable of advancing the female member 844 by hand or with a tool such as a torx or alien drive. The female member 844 includes an elongated female element 854 extending from the nut end 850. Each of the above elements are integrated as if they are a single unit with no movement with respect to one another, but alternatively the elongated female member 854 and the annular ring 852 can be separate elements as long as the annular ring 852 is free to move along the elongated female member 854.

The elongated male element 842 has external threads 847 and defines a screw shank. The elongated female element 854 defines a sheath and has internal threads 851 shown in FIG. 10B, which are functionally compatible with the external threads 847 as shown in FIG. 10B.

Thus, the above-described structure provides an adjustable interlocking fastener assembly for among other things mounting solar panel frames on support rails as discussed above and which will be more appreciated through the discussion below with respect to FIGS. 11-13.

The piercing member 856 includes washer with an annular ring 852 and a center opening. The center opening is sized and shaped to allow the elongated female member 844 passage through the center opening. Additionally, the annular ring 852 has a raised portion for penetrating a metal frame as described above. The raised portion defines a penetrating member 856. The penetrating member 856 has an edge sharp enough to pierce the surface treatment layer of the solar panel mounting rail as best seen in FIG. 13 and in accordance with the above teaching with respect to FIGS. 1-5.

Additionally, the washer defines a base, which is rounded and functions upon installation as a washer. As seen in the FIGS. 9-13, the washer is rounded and affixed to the nut end 850. Thusly, the integrated assembly in accordance with this exemplary embodiment defines the rounded head mid-clamp 840.

With particular reference to FIG. 10A, there is shown another feature of the integrated rounded head mid-clamp 840. A small threaded lock such as a piece of nylon 855 or other suitable materials capable of restricting the free longitudinal movement of the male and female portions is placed on the external threads 847. The nylon 855 serves to provide additional friction. The additional friction allows the T-bolt to be turned from below as the teeth 849 bite into the bottom rail and the annular ring 852 begins penetration of the surface treatment layer of the top solar panel frame.

Figure 12:
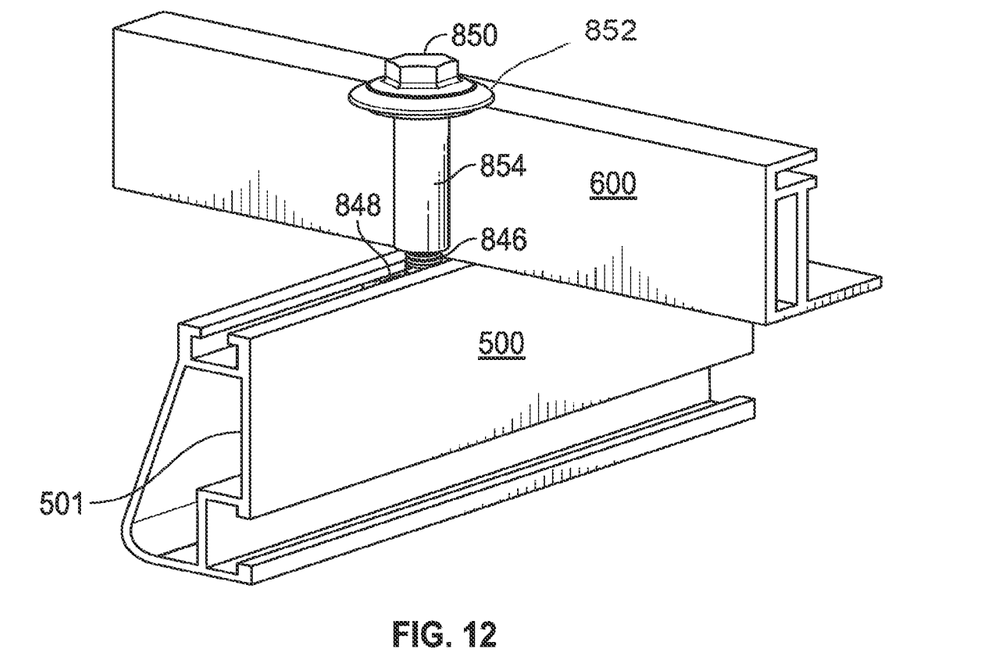
FIG. 12 illustrates a perspective view of the final stages of fastener assembly using the exemplary embodiment of the rounded head mid-clamp of FIG. 9.

With respect to FIGS. 11 and 12, there is shown the rounded head mid-clamp 840 of FIG. 9 being used to affix the solar panel frames to the support rail. Like the assembly set forth in FIG. 5, the rounded head mid-clamp 840 is used to clamp two parallel solar panel frames 400 and 600, and the mounting rail 500 that runs under and perpendicular to the frames 400 and 600. The male and female members, 842 and 844, respectively, are connected by loosely screwing the members together. The elongated portions 846 and 854 of the male and female portions, respectively, thereby form a vertical member, which is vertically aligned with the channel 501 of mounting rail 500.

As illustrated, the T-bolt end 848 is adjustable and rotates with respect to the female member 844. After alignment, the female member is pressed against the frames 400 and 600 with the penetrating members 856 piercing the surface treatment layers of frames 400 and 600. The T-bolt end 848 is turned as illustrated so that it fits within the channel 501. Upon proper placement, so that the T-bolt end 848 fits squarely into the channel, the nut end 850 is tightened. The nut end 850 is tightened until raised portions or teeth 849 pierce the surface treatment layer inside the channel 501. The installer uses one hand to tighten the nut end 850, while the other hand is simply there to guide the fastener so that assembly retains its proper positions. It will be understood that since the female member has already been affixed to the top panels 400 and 600 as illustrated, the rounded head mid-clamp 840 can in most instances be installed one-handed.

Figure 13:
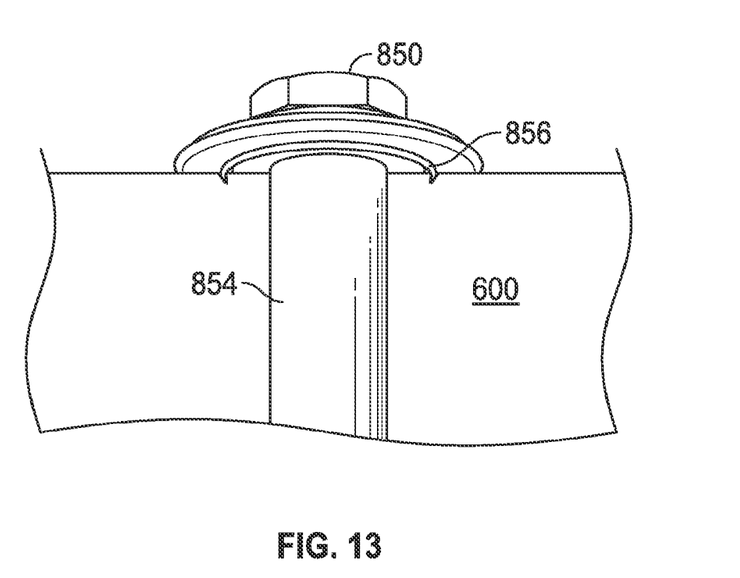
FIG. 13 is an enlarged perspective view illustrating the annular ring of the rounded head mid-clamp of FIG. 9. piercing the surface of the solar panel frame.

With particular reference to FIG. 13, there is shown an enlarged view of the piercing member 856 having annular ring 852 piercing the surface treatment layer of panel 600. In order to make solid electrical contact for providing the grounding circuit, the edge of the annular ring 852 needs to cut below this surface treatment layer. Once this surface treatment layer is pierced, the electrically conductive fastener 840 provides the grounding circuit in accordance the description above and as set forth below.

Since all of the elements describe above are electrically conductive, a reliable ground path is completed upon installation. Thus, the penetration of the surface treatment layer of the frames and rails by the electrically conductive rounded head mid-clamp clamping assembly by the numeral 840 completes the circuit upon proper installation.

While the foregoing detailed description has described several embodiments of the clamping assembly with grounding circuit in accordance with this disclosure, it is to be understood that the above description is illustrative only and not limiting of the disclosed invention. Particularly, the type of teeth used and various levels of hardness for the material piercing the objects may vary depending upon the situation. Additional variations are noted above and will be readily understood by those skilled in the art of fastening and more particularly mounting solar panels. It will be appreciated that the embodiments discussed above and the virtually infinite embodiments that could have easily been mentioned are all within the scope and spirit of this disclosure. Thus, the invention is to be limited only by the claims as set forth below.

What is claimed is:

1. An assembly for affixing a first object to a second object and a third object and providing a grounding path between the first, second, and third objects comprising:
   a first frame and a second frame, the first frame and the second frame comprising an elongated channel for receiving a solar panel;
   a rail guide;
   an electrically conductive fastener comprising:
      a shank extending from an enlarged end such that the shank terminates at an opposite end and the enlarged end comprises a top surface and a bottom surface, wherein the top surface comprises at least one raised portion for penetrating a surface of the rail guide; and
      a nut configured to receive the shank; and
   an electrically conductive piercing member comprising:
      a base with a central opening configured to receive the shank of the electrically conductive fastener therethrough;
      a pair of opposing ears with each respective ear being on an edge of the base of the piercing member such that the pair of opposing ears extend downward in a direction of the enlarged end and act as spacers between the first frame and the second frame; and
      at least one raised portion adjacent each ear disposed on the edge of the piercing member for penetrating a surface of the first frame and the second frame respectively.

2. The assembly of claim 1, wherein the shank comprises an externally threaded portion.

3. The assembly of claim 1, wherein the at least one raised portion adjacent each ear comprises a plurality of raised portions adjacent each ear.

4. A fastener assembly affixing a first solar panel mounting frame to a second solar panel mounting frame and a rail guide and providing a grounding path between the first and second mounting frames, and the rail guide comprising:
- an electrically conductive fastener comprising:
- a shank extending from an enlarged end such that the shank terminates at an opposite end and the enlarged end comprises a top surface and a bottom surface wherein the top surface comprises at least one raised portion for penetrating a surface of the rail guide; and
- a nut configured to receive the shank; and
- an electrically conductive piercing member comprising:
- a base with a central opening configured to receive the shank of the electrically conductive fastener therethrough;
- a pair of opposing ears with each respective ear being on an edge of the base of the piercing member such that the pair of opposing ears extend downward in a direction of the enlarged end and act as spacers between the first mounting frame and the second mounting frame; and
- a plurality of raised portions adjacent each ear of the pair of opposing ears disposed on the edge of the piercing member for penetrating a surface of the first mounting frame and the second mounting frame respectively.

5. The fastener assembly of claim 4, wherein the shank comprises an externally threaded portion.

6. The fastener assembly of claim 5, wherein the nut is configured to receive the externally threaded portion of the shank.

7. The fastener assembly of claim 4, wherein the top surface of the enlarged end comprises a plurality of raised portions.

* * * * *